UNITED STATES PATENT OFFICE.

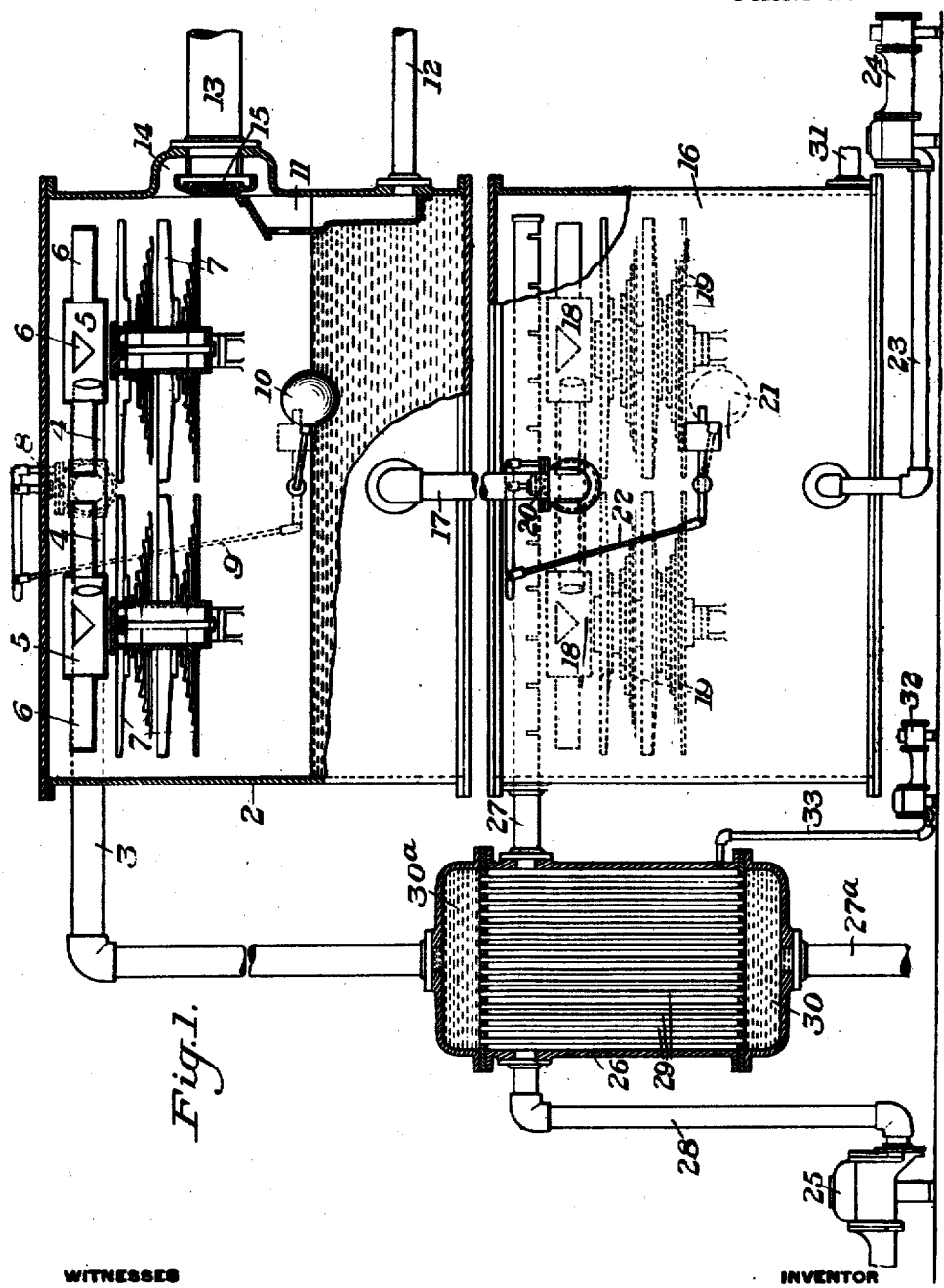

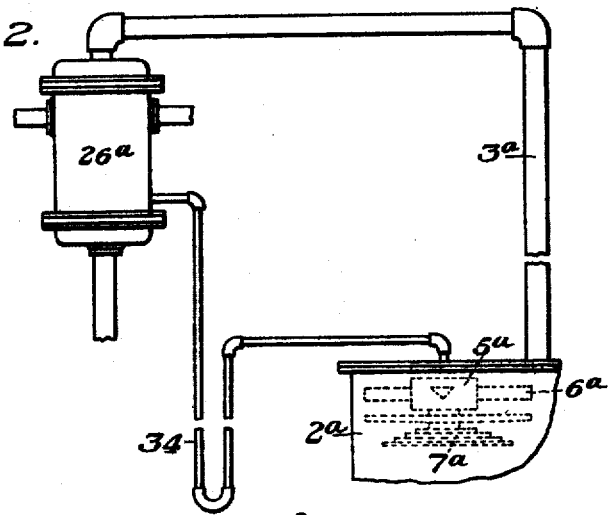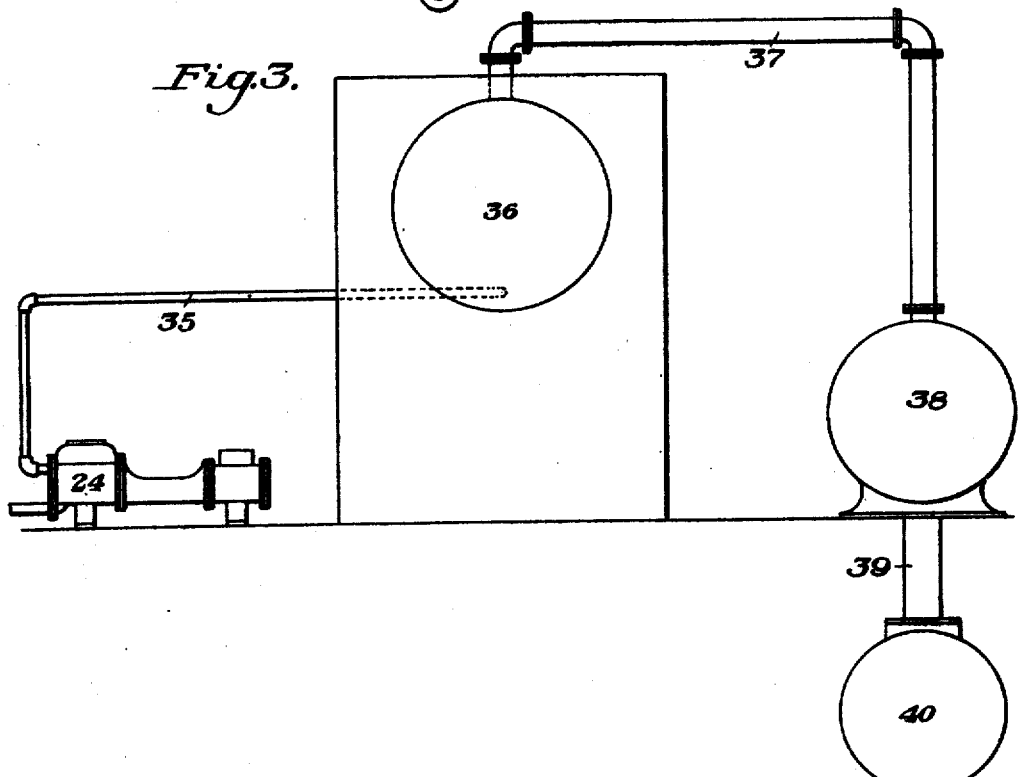

WILLIAM S. ELLIOTT, OF PITTSBURGH, PENNSYLVANIA.

TREATMENT OF LIQUIDS.

1,321,999. Specification of Letters Patent. Patented Nov. 18, 1919.

Application filed March 31, 1915. Serial No. 18,268.

*To all whom it may concern:*

Be it known that I, WILLIAM S. ELLIOTT, a citizen of the United States, residing at Pittsburgh, Allegheny county, Pennsylvania, have invented a new and useful Improvement in the Treatment of Liquids, of which the following is a full, clear, and exact description, reference being had to the accompanying drawings, forming part of this specification.

My invention has relation to the treatment of liquids for the purpose of removing the air and other gases contained or dissolved therein. While applicable to the treatment of other liquids, it is of particular advantage in the treatment of water for industrial purposes. It is a well known fact that the air contained in steam and water causes boiler corrosion, and also corrosion of the valves, pipes, fittings, and other metal parts with which the water or steam comes in contact. Besides the air, water contains other gases dissolved therein, such as corbon dioxid.

The object of the present invention is to provide a simple method and means for the treatment of water or other liquids by which a maximum percentage of the air and other gases contained therein may be removed from the liquid before the latter is used.

In carrying out my invention, the liquid is admitted into a receiver, into a region of vacuo, at such a temperature that it can exist only as superheated vapor; and is there caused to boil at a temperature lower than that corresponding to the temperature of the liquid immediately before it enters the receiver. The temperature in the receiver is lowered by lowering the pressure therein by any suitable means, such as a vacuum pump connected thereto. A condenser is preferably interposed between the vacuum pump and the receiver for condensing such hot vapors as are condensable before they reach the pump. The heat given up in this condenser may be used for the preliminary or partial heating of the liquid to be treated.

The nature of my invention will be better understood by reference to the accompanying drawings, in which I have illustrated one method and form of apparatus for carrying our the invention, and which will now be described, it being premised, however, that the particular apparatus shown is illustrative only and that the invention is capable of various other embodiments within the scope of the appended claims.

In the accompanying drawings Figure 1 is a view partly in side elevation and partly in section, and largely diagrammatic, of one form of apparatus for carrying out the invention.

Fig. 2 is a diagram of a portion of the apparatus showing a modification, and

Fig. 3 is a diagram showing one arrangement of apparatus for using the treated liquid.

In these drawings the numeral 2 designates a suitable heating tank or receptacle into which the liquid to be treated is conducted by means of the supply pipe 3. This pipe is shown as entering the upper portion of the heater at the central portion thereof, and is branched as indicated at 4, these branches supplying the spray pans 5. These pans are shown as having overflow or spray troughs 6 which discharge onto a suitable arrangement of distributers 7. Pipe 3 is provided with a control valve 8 having actuating connections 9 with a float 10 within the heater whereby a substantially constant level of the water is maintained. 11 designates an overflow chamber within the heater and 12 a discharge pipe therefor. This chamber 11 not only takes care of any overflow which may occur in case the level should for any reason rise beyond its normal; but it also takes care of the entrainment from the steam supply pipe 13. The latter opens into an offset portion 14 of the heater 2 and is arranged to discharge against a separator plate 15, the drip from which falls into the chamber 11. The purpose of the separator 15 is to separate out any oil which may be entrained with the steam in pipe 13. The steam delivered by this pipe is employed for the purpose of heating the water in the tank, although any other heating means may be employed.

16 designates a receiver which is connected by a pipe 17 with the discharge of the heater 2. The pipe enters the upper portion of the receiver and the latter is provided with spray pans 18 and distributers 19 similar to those in the heater. Any other suitable means may, however, be provided for receiving the water as it enters the receiver.

20 is a control valve for the pipe 17, and 21 is a control float therefor. 22 is the actuating connection between the float and the valve. 23 is an offtake pipe for the treated water leading to a pump 24.

The receiver 16 is connected with a vacuum pump 25 through a condenser 26 by means of the pipes 27 and 28. The condenser 26 has a water supply connection at 27ª discharging into the bottom chamber 30, a bank of heating tubes 29 connecting this chamber 30 with an upper chamber 30ª. The pipe 3 is connected to the outlet of this chamber 30ª. 31 is a sediment discharge or clean-out connection for the receiver.

The operation is as follows: Water entering the condenser 26 from the pipe 27ª passes upwardly through the tubes 29 to the chamber 30ª, and thence into the heater 2 by way of the pipe 3. It is brought to the desired temperature in this heater and is then discharged into the receiver in which a partial vacuum is maintained by the action of the pump 25. The effect of this vacuum upon the water entering the receiver is to cause it to boil at a temperature which is lower than the temperature of the liquid immediately before it enters the receiver. By maintaining a sufficient degree of vacuum in this receiver the water entering it is immediately subjected to a violent boiling action and is in part rapidly converted into vapor. In fact, the boiling action which occurs is of such a violent character that it is in the nature of an explosion or flashing. The water then flows down over the series of distributers in a distributed or film-like condition, so that all portions thereof are subjected to the vacuum action. The combined effect of the flashing or explosion and of the vacuum acting upon the water in moving over the distributers results in the air and other dissolved gases contained in the water being extracted to a maximum extent. The water vapor and other gases thus liberated by the boiling are drawn off through the condenser 26 by the action of the pump 25; and in passing over the bank of tubes 26 impart a very considerable degree of heat to the water contained in said tubes before it enters the heater 2. At the same time, by reason of the cooling action of the water in the pipes 26 a large percentage of the condensable vapors are condensed, and the liquid of condensation is drawn off by the action of a suitable pump 32 through the pipe 33, or otherwise disposed of. For instance, instead of the pump 32, I may (as shown in Fig. 2) elevate the condenser, as indicated at 26ª, to a height above the heater 2ª such as to create a head of water in the U-shaped tube 34 leading into the heater 2ª sufficient to discharge the water from the condenser into the heater, against the action of the vacuum in the condenser.

In Fig. 3 I have shown diagrammatically an arrangement of boiler, turbine and condenser apparatus for utilizing the treated water. In this apparatus the pump 24, before referred to, delivers the purified water through the pipe 35 into a boiler 36. The steam generated in this boiler is conducted by the pipe 37 to the turbine 38. The exhaust of this turbine is connected by the pipe 39 with a condenser 40, which may be of any well known type. This results in a very considerable percentage of the contained scale-forming elements in the water being precipitated to the bottom of the receiver in the form of mud which can be readily removed. This is also a valuable feature of my invention.

On account of the removal of the air from the water in the manner described, the steam reaches the condenser 40 in a condition practically free from air, provided there is no leakage in the pipe line between the condenser and turbine.

With the old condensers employing a large dry pump, all of the air and other gases must be extracted by the use of very large vacuum air pumps, working against a high vacuum. By the employment of my system, the dry pump at the main condenser need be only of a small per cent. of the capacity of that heretofore required, as a large percentage of the air has already been removed from the liquid at a vacuum pressure which is but a small percentage of that employed in the main condenser. This results in great economy in the operation of the system. In actual operation I have found that under economical commercial operating conditions my invention will effect a separation of ninety to ninety-eight per cent. of the contained air. It will accomplish a separation such that the remaining dissolved gases will, at a temperature of thirty-two degrees Fahrenheit at 14.7 pounds per square inch, occupy a volume of .2 per cent. to .1 per cent., as computed upon the volume of the dissolving liquids. These figures apply to substantially all simple gases which are found dissolved in natural air as a mixture or constituent of a mixture, with the exception of carbon dioxid. The latter is separated to as complete an extent as boiling it for a limited time is able to accomplish.

My invention also reduces all soluble carbonates dissolved in the liquid in the form of bi-carbonates from the state of solubility to that of insolubility.

A further advantage of my invention is, that in its employment the slight heat losses which occur are more than recovered by the gain in the relative power required to operate the large vacuum pumps heretofore required in the operation of condensers, to say nothing of the gain due to the increased vacuum in the condensers. It will be readily understood that the form of the various apparatus described can be widely varied, and that any suitable form of heater and receiver can be used. Where the water to be treated is already at the proper temperature the heater 2 may be entirely omitted and the water conducted directly to the receiver, and various other changes can be made.

What I claim is:

1. The herein described method of treating liquids for the removal of air and other contained gases, which consists in heating the liquid to be treated and then introducing the same into a chamber, maintaining a pressure in said chamber lower than the pressure corresponding to the temperature of the liquid immediately before entering said chamber, and distributing the liquid in said chamber, whereby it is subjected to a boiling action to a degree corresponding to the pressure in the receiver, and utilizing the vacuum-producing means to draw the vapors and gases produced by the boiling through a condenser, substantially as described.

2. The herein described method of treating liquids for the removal of air and other contained gases, which consists in heating the liquid to be treated and then introducing the same into a chamber, maintaining a pressure in said chamber lower than the pressure corresponding to the temperature of the liquid immediately before entering said chamber, and distributing the liquid in said receiver whereby it is subjected to a boiling action to a degree corresponding to the pressure in the chamber, and exhausting the vapors and gases from the receiver and passing them through a condenser and passing the liquid to be heated through said condenser, substantially as described.

3. The method of treating liquids for the removal of air and other gases contained therein, which consists in introducing the liquid into a chamber, distributing the liquid in said chamber, and maintaining in said chamber pressure and temperature conditions such as to cause a violent ebullition or flashing of the liquid when it enters the said chamber under the action of the heat contained in the liquid, substantially as described.

4. The method of treating liquids for the removal of air and other contained gases, which consists in introducing the liquid into a chamber, and maintaining in said chamber pressure and temperature conditions which will cause a voilent ebullition or flashing of the liquid as it enters said chamber under the action of the heat contained in the liquid, substantially as described.

5. The method of treating liquids for the removal of air and other contained gases, which consists in introducing the liquid into a chamber, maintaining in said chamber pressure and temperature conditions which will cause a voilent ebullition or flashing of the liquid as it enters said chamber under the action of the heat contained in the liquid, and causing the liquid to flow downwardly in a distributed condition through said chamber, substantially as described.

6. The method of treating liquids for the removal of air and other contained gases, which consists in introducing the liquid in a heated condition into a chamber, maintaining a sufficient vacuum in said chamber to cause a voilent ebullition or flashing of the liquid on entering said chamber under the action of the heat contained in said liquid, and causing the liquid to flow through said chamber in a distributed or film-like condition subject to the action of the vacuum therein, substantially as described.

7. The method of treating liquids for the removal of air and other contained gases and also for the removal of scale-forming elements contained therein, which consists in introducing the liquid into a chamber in heated condition, and maintaining a sufficient vacuum in said chamber to cause a violent ebullition or flashing of the liquid as it enters said chamber under the action of the heat contained in the liquid, whereby the air and contained gases are liberated and scale-forming elements are precipitated, substantially as described.

8. The method of treating liquids for the removal of air and other contained gases, which consists in introducing the liquid into a chamber in a heated condition, maintaining a sufficient vacuum in said chamber to cause a violent ebullition or flashing of the liquid as it enters said chamber under the action of the heat contained therein, causing the liquid to flow through said chamber in a distributed condition while subjected to the action of the vacuum therein, and automatically controlling the level of the liquid in said chamber, substantially as described.

9. The method of treating liquids for the removal of air and other contained gases, which consists in introducing the liquid into a chamber at a relatively high temperature, maintaining in said chamber a pressure sufficiently lower than the vapor pressure of the hot liquid before it enters said chamber to cause a violent ebullition or flashing of the liquid as it enters the chamber, and removing the liberated air and gases from said chamber and utilizing the same as a heating medium, substantially as described.

10. The method of treating liquids by the removal of air and other contained gases, which consists in introducing the liquid in a heated condition into a chamber, maintaining in said chamber a pressure sufficiently lower than the vapor pressure of the liquid at its temperature before entering the chamber to cause a violent ebullition or flashing of the liquid as it enters the chamber, and withdrawing the heated vapor and gases from the chamber and utilizing the same for heating the liquid before it is introduced into the chamber, substantially as described.

In testimony whereof, I have hereunto set my hand.

WILLIAM S. ELLIOTT.

Witnesses:
 GEO. B. BLEMING,
 GEORGE H. PARMELEE.